United States Patent [19]
Sugiyama et al.

[11] 4,302,975
[45] Dec. 1, 1981

[54] DEVICE FOR HOLDING A ROTOR BODY IN A BALANCE TESTOR

[75] Inventors: Matsuyoshi Sugiyama, Susono; Hiroshi Okano, Mishima, both of Japan

[73] Assignee: Toyota Jidosha Kogyo Kabushiki Kaisha, Toyota, Japan

[21] Appl. No.: 124,276

[22] Filed: Feb. 25, 1980

[30] Foreign Application Priority Data

Dec. 18, 1979 [JP] Japan .............................. 54-163458

[51] Int. Cl.³ ............................................ G01M 1/06
[52] U.S. Cl. ...................................... 73/460; 73/487
[58] Field of Search ............ 73/66, 459, 460, 462–468, 73/471–479, 481, 487; 279/1 Q, 1 S, 1 SG; 403/1, 221, 225, 372

[56] References Cited
U.S. PATENT DOCUMENTS 1,832,479 11/1931 Eakins ................................. 73/480
2,987,924 6/1961 Karrels ................................ 73/480

FOREIGN PATENT DOCUMENTS 1243234 8/1971 United Kingdom ................ 403/372

*Primary Examiner*—James J. Gill
*Attorney, Agent, or Firm*—Stevens, Davis, Miller & Mosher

[57] ABSTRACT

A device for holding a small weight rotor body on a shaft of a balance testor. The shaft has a stopper portion engaging the rotor body inserted on the shaft, and has a pair of axially spaced apart annular grooves to which respective O-rings are fitted. The O-rings generate a frictional force for fixedly connecting the rotor body on the shaft during the measurement of the unbalance.

1 Claim, 2 Drawing Figures

DEVICE FOR HOLDING A ROTOR BODY IN A BALANCE TESTOR

DESCRIPTION OF THE INVENTION

The present invention relates to a balance testor for measuring the unbalance of a small weight rotor body, such as an impellar provided in a turbo-charger for a vehicle internal combustion engine, and more particularly relates to a rotor holding device utilized in the balance testor.

In a balance testor for measuring the unbalance of a rotor body, the rotor body is inserted into and fixed to a shaft of the balance testor, the shaft is rotated under a predetermined speed while the unbalance at every angular position of the rotor is measured, and a mass corresponding to the measured unbalance is, at every angular position of the rotor body, removed from or added to the rotor body. Therefore, when an angular displacement of the rotor body with respect to the shaft is generated during the rotation of the shaft, a precise measurement of the unbalance cannot be carried out. Therefore, in the prior art, a positive fixing unit, such as a nut is utilized, which is screwed into the shaft for fixedly connecting the rotor body on the shaft.

However, the prior art arrangement suffers from a drawback in that a precise measurement cannot be effected when the weight of a rotor body is small, for example, 50 g or less. This is because the unbalance caused by the nut on the shaft is, on one hand, not negligibly small when compared with the rotor body due to the small weight of the rotor body.

The prior art suffers from another drawback in that a prolonged time is necessary for connecting the rotor body to the shaft, since the nut must be screw threaded into the shaft. The angular position of the nut with respect to the shaft is, on the other hand, not always maintained at a predetermined angle. Further, a tightening force applied to the rotor body causes it to be deformed, which also decreases the preciseness of the measurement. The preciseness is also decreased by the fact that the nut or shaft is damaged during the tightening. The tool has flat surfaces for engaging the nut, which also adversely affects the precises of the measurement of the unbalance.

Therefore, an object of the present invention is to provide an improved holder for connecting the rotor body to a shaft of a balance testor, capable of overcoming the above-mentioned drawbacks in the prior art.

Another object of the invention is to provide a holder in a balance testor, capable of effecting a measurement with high precision.

According to the present invention, a device for holding a rotor body in a balance testor provided with a pair of axially spaced apart bearing units, is provided, which comprises a shaft having axially spaced apart ends, which are rested on the respective bearing units, the rotor being adapted to be inserted to the shaft, said shaft having a stopper for engaging the rotor body so that the rotor body is placed on a predetermined position of the shaft, and, elastic means arranged between the inner surface of the rotor body and the outer body of the shaft for generating an elastic force for maintaining a fixed angular position of the rotor body on the shaft during the rotation of the shaft.

The present invention will now be explained in more detail with reference to the attached drawings in which.

Figure 1:
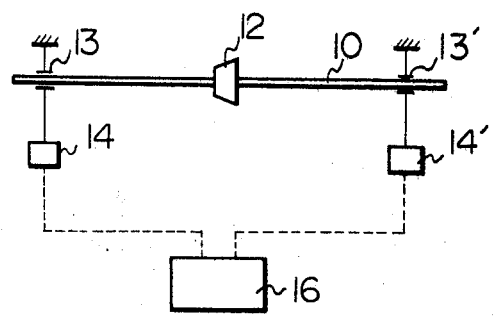
FIG. 1 is a schematic diagram illustrating a system for measuring a dynamic balance of a rotor body.

Referring to FIG. 1, which schematically illustrates a balance testor, a supporting shaft 10 on which a rotor body 12 to be tested is mounted. The supporting shaft 10 is, on its ends, supported by a pair of axially spaced apart bearing units 13 and 13'. A pair of pick-up or transducer devices 14 and 14' is adapted for detecting the force generated in the corresponding bearing units 13 and 13', respectively, during the rotation of the shaft 10. The force corresponds to the displacement of the shaft 10. Electrical signals from the pick-up devices are introduced into an electrical control circuit 16 for indicating the unbalance of the rotor body 12 being tested.

Figure 2:
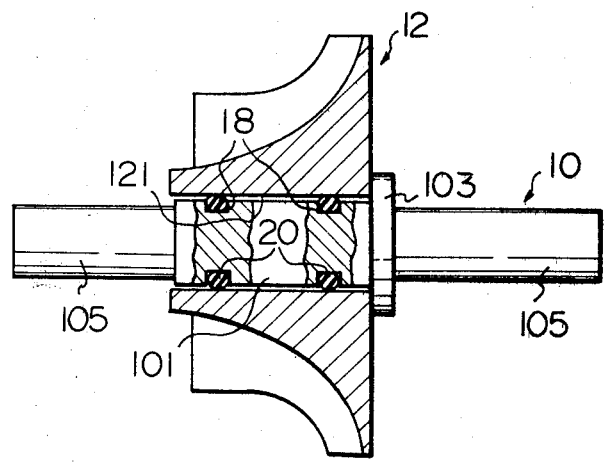
FIG. 2 is a longitudinal sectional view illustrating a holder for connecting the rotor body to the shaft.

Referring now to FIG. 2, mounting of the rotor body 12 onto the supporting shaft 10 is illustrated. The shaft 10 has an annular projection 103 serving as a stopper for the rotor body 12. On one side of the stopper 103, the shaft 10 has a first portion 101 of large diameter, on which the rotor body 12 is placed, and a second portion of small diameter 105. Therefore, the shaft 10 forms a body of revolution, which can be easily made by a lathe without generation of any unbalance.

On the portion 101 located on one side of the stopper 103, a pair of axially spaced annular grooves 18 are formed. A pair of ring members 20, such as O-rings, are fitted to the respective grooves 18.

In this embodiment, the rotor body 12 is an impeller utilized in a turbo-charger for an internal combustion engine. The rotor body 12 has a central bore 121, which is inserted on the first portion 101 of the shaft via the O-rings 20 fitted to the grooves 18. The O-rings 20, which contact the inner surface of the bore 121, are slightly and resiliently deformed, so that a frictional force in generated between the O-rings 20 and the rotor body 12 and between the rotor body 12 and the stopper 103. This frictional force causes the rotor body 12 to be held on the shaft 10 and prevents any angular displacement from occurring between the rotor body 12 and the shaft 10. Dimensions of the portion 101 and the bore 121 are such that the portion 101 and the bore 121, during the insertion of the rotor body into the shaft, does not substantially contact with each other. Therefore, the shaft 10, which is normally made of a relatively soft and light metal, is not damaged during insertion.

Measurement of the unbalance of a rotor body according to the present invention is hereinafter described. A rotor body 12 to be tested is inserted on the portion 101 of the shaft 10 until the rotor body 12 is, on one side thereof, contacted with the stopper 103.

The O-ring 20 causes frictional force to generate and thereby fixedly holds the rotor body 12 on the shaft 10 as has already described. Due to frictional force, the rotor body 12 is substantially fixedly connected to the shaft 10. This frictional connection is stable, since the weight of the rotor body is 50 g or less.

In order to measure the unbalance of the rotor 12, the ends of the shaft 10, on which the rotor body 12 is mounted, as described above, rest on the respective bearing units 13 and 13' shown in FIG. 1 Then, the shaft is rotated under a predetermined constant speed, while the transducers 14 and 14' produce, at every angular position of the rotor 12, electrical signals corresponding to the unbalance of the rotor at the angular position. The electrical signals are transmitted to the control unit 16 in order to indicate the unbalance and to effect the necessary correction, as is well known to those skilled in this art. During the rotation of the shaft 10, to which the rotor body 12 is connected by the frictional force generated by the holder, no angular displacement of the rotor body with respect to the shaft 10 occurs since the aerodynamic force generated between the rotor body 12 and the shaft 10 is smaller than the frictional force when the weight of the rotor body is small.

According to the present invention, since, in order to hold the rotor body, the O-rings are utilized in stead of the screw means in the prior art, deformation, which adversely affects the precise measurement, does not take place. The O-rings are easily made to have a high concentricity. In addition to this, the O-rings can generate elastic frictional force, which is equally applied to every portion of the rotor body. Therefore, unbalance generated when the rotor body is connected to the shaft is small. As a result of this, a precise measurement can be carried out.

According to the present invention, connection of the rotor body to the shaft is effected by only inserting the rotor body onto the shaft. Thus, labour efficiency is increased when compared with the prior art.

While the present invention is described with reference to this embodiment, modifications or changes may be effected by those skilled in this art without departing from the scope of the present invention.

What is claimed is:

1. A balance testor comprising;
   a pair of bearing units;
   a shaft for receiving a rotor body to be tested;
   a pair of pick-up units adapted for detecting the force applied to the bearing units during the rotation of the shaft and providing elastic signals corresponding to the force;
   a stopper formed on the shaft for placing the rotor body on a predetermined axial position of the shaft;
   the shaft being provided with a first portion of a large diameter on which the rotor body is located and a second position of a small diameter, the large diameter portion being provided with axially spaced apart annular grooves on the outer surface thereof; and
   ring members made of an elastic material, said members being, on the inner side thereof, fitted to the respective grooves and being, on the outer side thereof, contacting with the inner surface of the rotor body.

* * * * *